(12) United States Patent
Travers et al.

(10) Patent No.: US 12,092,822 B2
(45) Date of Patent: Sep. 17, 2024

(54) MULTI-ANTENNA AUGMENTED REALITY DISPLAY

(71) Applicant: Vuzix Corporation, West Henrietta, NY (US)

(72) Inventors: Craig R. Travers, Honeoye Falls, NY (US); Robert W. Gray, Rochester, NY (US)

(73) Assignee: Vuzix Corporation, West Henrietta, NY (US)

( * ) Notice: Subject to any disclaimer, the term of this patent is extended or adjusted under 35 U.S.C. 154(b) by 0 days.

(21) Appl. No.: 18/217,503

(22) Filed: Jun. 30, 2023

(65) Prior Publication Data

US 2024/0004196 A1     Jan. 4, 2024

Related U.S. Application Data

(60) Provisional application No. 63/357,330, filed on Jun. 30, 2022.

(51) Int. Cl.
*G02B 27/01*     (2006.01)
*H01Q 1/27*     (2006.01)
*H04W 4/02*     (2018.01)

(52) U.S. Cl.
CPC ........... *G02B 27/017* (2013.01); *H01Q 1/273* (2013.01); *H04W 4/025* (2013.01)

(58) Field of Classification Search
None
See application file for complete search history.

(56) References Cited

U.S. PATENT DOCUMENTS

| 9,798,144 | B2 | 10/2017 | Sako et al. |
| 11,607,600 | B2 * | 3/2023 | Travers ............... A63B 71/0622 |
| 2003/0115010 | A1 | 6/2003 | Estep |
| 2014/0362113 | A1 | 12/2014 | Benson et al. |
| 2015/0253573 | A1 | 9/2015 | Sako et al. |
| 2016/0049108 | A1 | 2/2016 | Yajima et al. |

(Continued)

FOREIGN PATENT DOCUMENTS

| DE | 102013022325 A1 | 4/2015 |
| EP | 3535759 A1 | 9/2019 |

(Continued)

OTHER PUBLICATIONS

European Patent Office, Extended European Search Report in European patent application No. 18848119.6, dated Mar. 25, 2021.

(Continued)

*Primary Examiner* — Duane N Taylor, Jr.
(74) *Attorney, Agent, or Firm* — Harter Secrest & Emery LLP; Jacob D. Merrill, Esq.

(57) ABSTRACT

Systems and methods for switching between data connections establishing between an augmented reality display unit and a peripheral device. The systems and methods can automatically switch between communication modules, antennas, or frequencies based on sensor data to reduce or eliminate the effects of proximity to or submersion beneath water. In some examples, switching between communication modules, antennas, or frequencies is based on motion of the user's head or the electrical resistance, salinity, or chemical composition of a body of water the augmented reality display unit is placed within.

20 Claims, 8 Drawing Sheets

(56) References Cited

U.S. PATENT DOCUMENTS

| | | |
|---|---|---|
| 2016/0054569 A1 | 2/2016 | Lewis |
| 2017/0146644 A1 | 5/2017 | Tucker |
| 2017/0168566 A1* | 6/2017 | Osterhout ............ G02B 27/017 |
| 2017/0178524 A1 | 6/2017 | Firmin |
| 2018/0003983 A1 | 1/2018 | Sako et al. |
| 2019/0369836 A1 | 12/2019 | Faulkner et al. |
| 2021/0154558 A1* | 5/2021 | Travers .............. A63B 71/0622 |

FOREIGN PATENT DOCUMENTS

| | | |
|---|---|---|
| GB | 2283333 A | 5/1995 |
| WO | 2013049248 A2 | 4/2013 |

OTHER PUBLICATIONS

United States Patent & Trademark Office (ISA/US), International Search Report in International patent application No. PCT/US2018/047735, dated Oct. 24, 2018.

\* cited by examiner

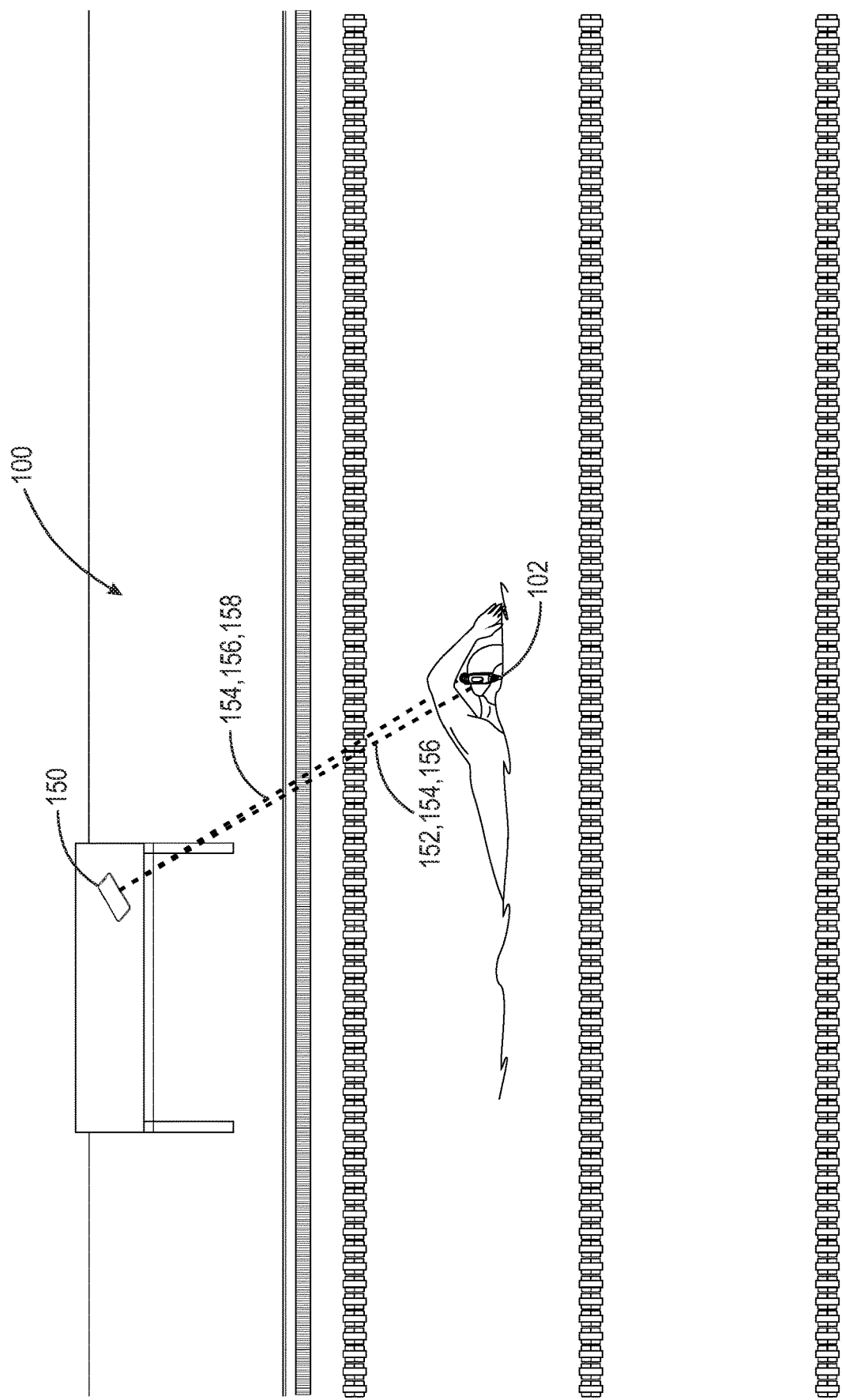

MULTI-ANTENNA AUGMENTED REALITY DISPLAY

TECHNICAL FIELD

The present disclosure generally relates to electronic displays and more particularly to displays that are used in augmented reality (AR) display systems in a water environment.

BACKGROUND

Head-mounted augmented reality (AR) display systems are being developed for a range of diverse uses including military, commercial, industrial, fire-fighting, and entertainment applications. For many of these applications, there is value in forming a virtual image that can be visually superimposed over the real-world image that lies in the field of view of the display system user. Additionally, professional and amateur athletes can take advantage of displayed information such as heart rate, and/or the user's location, and/or the surrounding environment, including rear views. Swimmers perform in a particularly demanding environment for head mounted display systems. In addition to the water infiltration issues associated with underwater electronic display systems, there are also head movement patterns, some of which are not typical of other sports, and the need for small, streamline form factors to reduce drag.

As is known to those skilled in the arts, for example for scuba divers, typical underwater AR systems can be bulky. Any type of camera mounting arrangement can produce significant drag on a swimmer. Additionally, certain motions of the swimmer's head and/or the proximity to or submersion beneath the surface of the water, may contribute to signal interference of wireless data connections between an underwater electronic display system and devices in the surrounding environment.

Swimmers of all kinds, but particularly competitive swimmers, would benefit from being able to view forward, rear, and side views of the surrounding environment without having to stop or change body movement in any significant way from the swimming motion. Incorporating software into a swimmer's AR system to relieve mental activity not directly related to swimming motions, e.g., lap counting, distance estimations to turning points, etc., could significantly help the swimmer to keep focus on swimming motion and overall body control. Underwater electronic display systems would also benefit from a dynamic and flexible data connection configuration that reduces signal interference between the electronic display systems and devices in the surrounding environment.

Therefore, there are benefits to a head-mounted display system for swimmers and other water related personal that performs in water, having the capability for receiving, transmitting and/or displaying a variety of swimming, and/or swimmer, and/or environment-related information to the user.

SUMMARY

The present disclosure is directed to one or more exemplary embodiments of systems and methods for switching between data connections established between an augmented reality display unit and a peripheral device. The systems and methods can automatically switch between communication modules, antennas, or frequencies based on sensor data to reduce or eliminate the effects of proximity to or submersion beneath water. In some examples, switching between communication modules, antennas, or frequencies is based on motion of the user's head or the electrical resistance, salinity, or chemical composition of a body of water the augmented reality display unit is placed within.

These and other aspects, objects, features, and advantages of the present disclosure will be more clearly understood and appreciated from the following detailed description of the embodiments and appended claims, and by reference to the accompanying drawing figures. In an exemplary embodiment, the present disclosure provides a method of transmitting or receiving data from an augmented reality display unit. The method includes: transmitting or receiving data using a first data connection established between a first communications module or a first antenna of the augmented reality display unit and a peripheral device; receiving, by at least one processor of the augmented reality display unit, a sensor signal obtained by at least one sensor of the augmented reality display unit; transmitting or receiving the data using a second data connection established between a second communications module or a second antenna of the augmented reality display unit, based on the sensor signal; and generating and displaying an image to a viewer using the data received via the first and/or second wireless data connection.

In another exemplary embodiment, the present disclosure provides a method of transmitting or receiving data from an augmented reality display unit. The method includes: transmitting or receiving data using a first data connection established between a communications module or an antenna of the augmented reality display unit and a peripheral device, wherein the first data connection utilizes a first frequency range; receiving by at least one processor of the augmented reality display unit, a sensor signal obtained by at least one sensor of the augmented reality display unit; transmitting or receiving the data using the first data connection at a second frequency range different from the first frequency range based on the sensor signal; and generating and displaying an image to a viewer using the data received via the first data connection.

BRIEF DESCRIPTION OF THE DRAWING FIGURES

The accompanying drawings are incorporated herein as part of the specification. The drawings described herein illustrate embodiments of the presently disclosed subject matter and are illustrative of selected principles and teachings of the present disclosure. However, the drawings do not illustrate all possible implementations of the presently disclosed subject matter and are not intended to limit the scope of the present disclosure in any way.

FIG. 5 is a contextual view of an augmented reality system according to an exemplary embodiment of the presently disclosed subject matter.

DETAILED DESCRIPTION

Figure 1:
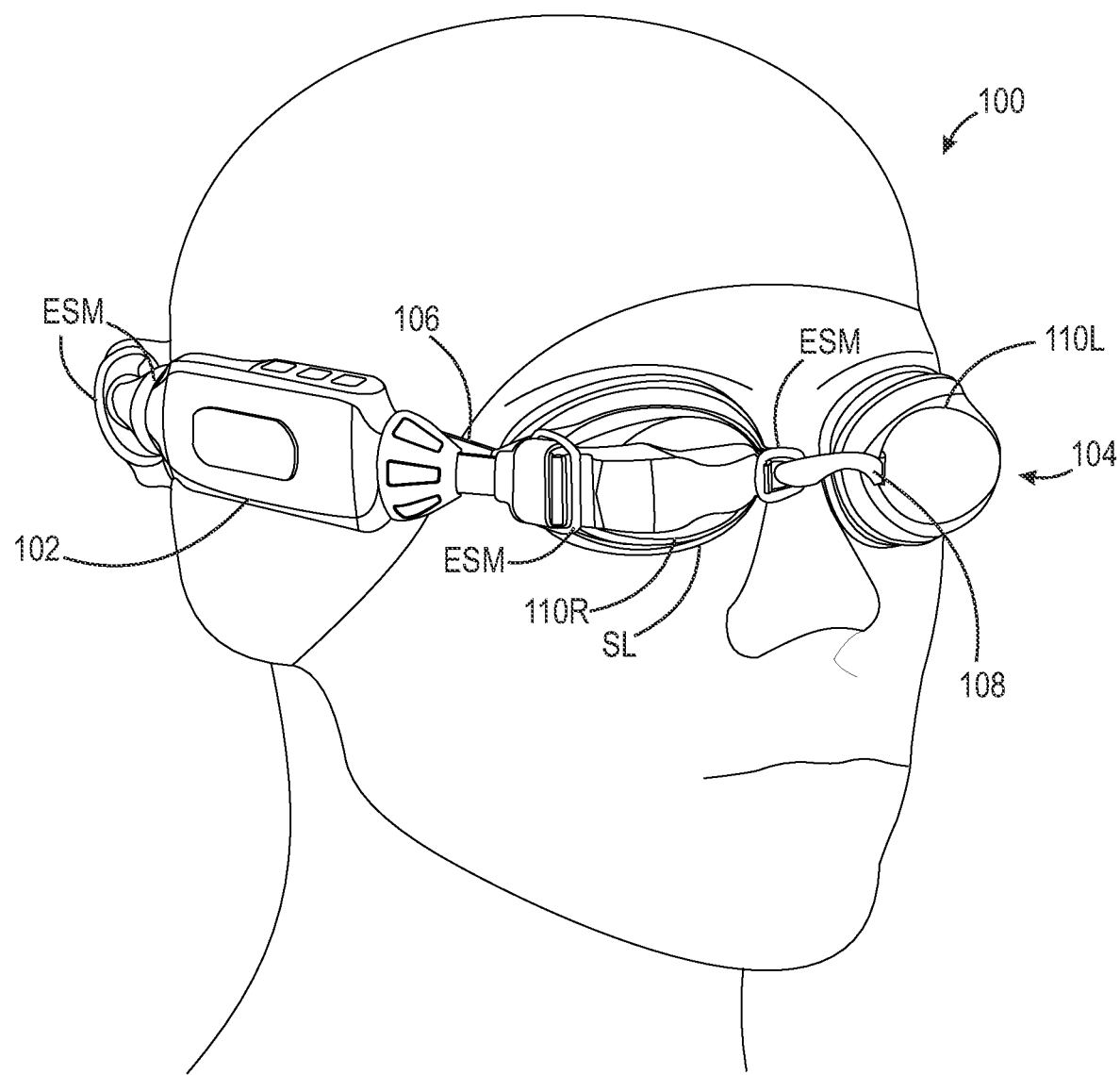
FIG. 1 is front-perspective view of augmented reality display unit secured to the head and goggles of a user/swimmer according to an exemplary embodiment of the presently disclosed subject matter.

It is to be understood that the invention may assume various alternative orientations and step sequences, except where expressly specified to the contrary. It is also to be understood that the specific assemblies and systems illustrated in the attached drawings and described in the following specification are simply exemplary embodiments of the inventive concepts defined herein. Hence, specific dimensions, directions, or other physical characteristics relating to the embodiments disclosed are not to be considered as limiting, unless expressly stated otherwise. Also, although they may not be, like elements in various embodiments described herein may be commonly referred to with like reference numerals within this section of the application.

One skilled in the relevant art will recognize that the elements and techniques described herein can be practiced without one or more of the specific details, or with other methods, components, materials, etc. In some instances, well-known structures, materials, or operations are not shown or described in detail to avoid obscuring certain aspects of the present disclosure. Reference throughout the specification to "one embodiment" or "an embodiment" means that a particular feature, structure, or characteristic described in connection with the embodiment is included in at least one embodiment of the present disclosure. Thus, the appearance of the phrase "in one embodiment" or "in an embodiment" throughout the specification is not necessarily referring to the same embodiment. However, the particular features, structures, or characteristics described may be combined in any suitable manner in one or more embodiments.

Where they are used herein, the terms "first," "second," and so on, do not necessarily denote any ordinal, sequential, or priority relation, but are simply used to clearly distinguish one element or set of elements from another, unless specified otherwise.

Where used herein, the term "exemplary" is meant to be "an example of," and is not intended to suggest any preferred or ideal embodiment.

Where they are used herein, the terms "viewer," "swimmer", "wearer," "operator", "observer", and "user" are equivalent and refer to the person or machine that wears and views images using an augmented reality system.

Where used herein, the term "coupled" is intended to indicate a physical association, connection, relation, or linking, between two or more components, such that the disposition of one component affects the spatial disposition of a component to which it is coupled. For mechanical coupling, two components need not be in direct contact, but can be linked through one or more intermediary components. A component for optical coupling allows light energy to be input to, or output from, an optical apparatus.

Where used herein, the term "eyebox" is intended to define a two-dimensional area or three-dimensional volume within which an eye, or other optical component, located at any position within the eyebox therein forms one or more focused images.

Where used herein, the term "substantially" is intended to mean within the tolerance range of the equipment used to produce the value, or, in some examples, is intended to mean plus or minus 10%, or plus or minus 5%, or plus or minus 1%, unless otherwise expressly specified.

FIG. 1 illustrates a front perspective view of one example embodiment of an augmented reality system 100. As shown, the augmented reality system 100 includes at least an augmented reality display unit 102 and pair of goggles 104. The goggles 104 include a flexible goggle strap 106 and a nose bridge 108, where the nose bridge 108 is configured to secure a left-eye covering 110L and a right-eye covering 110R across the face of the swimmer or viewer. As will be appreciated by those with ordinary skill in the art, in some examples, goggles 104 can include respective sealing members SL disposed between each respective eye-covering 110L, 110R and the user's face to create a water-tight seal trapping air between the user's eyes and each respective eye-covering, allowing the user to see without water entering their eyes. Alternatively, each respective covering 110R and 110L can be formed with a perimeter flange sealing member SL that matingly engages with the user's face and creates the water-tight seal over the user's eyes. Additionally, it should be appreciated that, although illustrated and described as a pair of swimming goggles, goggles 104 can take the form of any form of goggle or eye covering, e.g., a pair of ski goggles, driving or motorcycle goggles, lab goggles, SCUBA goggles, and goggles that create eye protection when using power tools such as welding, blow-torches, etc.

As illustrated in FIG. 1, augmented reality display unit 102 can be retrofitted and secured to any type of goggles 104 via one or more elastic securing members ESM. As shown in FIG. 1, in one example embodiment, at least one elastic securing member ESM is arranged to surround a portion of the nose bridge 108 and engage with a hooked portion at a first end E1 (discussed below with respect to FIG. 2) of the augmented reality display unit 102, securing the augmented reality display unit 102 to at least one of the eye coverings 110R/110L. As will be discussed below, the augmented reality display unit 102, is positioned next to, and arranged to wrap around, at least a portion of the user's head. The respective portions of the augmented reality display unit 102 can be secured to the goggle strap 106 by additional elastic securing members ESM.

Figure 2:
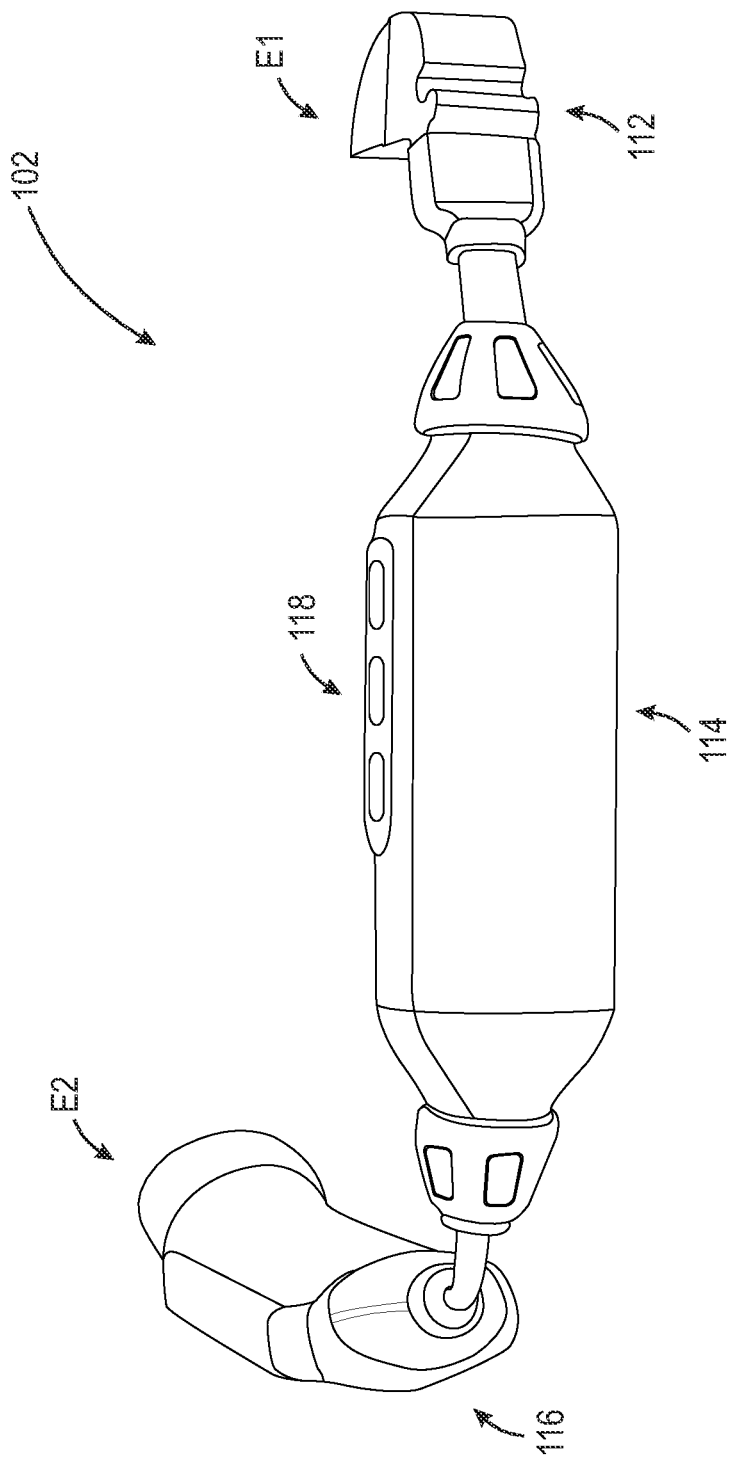
FIG. 2 is a side perspective view of an augmented reality display unit in isolation according to an exemplary embodiment of the presently disclosed subject matter.

FIG. 2 illustrates a side perspective view of one example embodiment of augmented reality display unit 102 in isolation. As shown, the augmented reality display unit 102 has a first end E1 and a second end E2. Between the first end E1 and the second end E2, augmented reality display unit 102 includes a display portion 112, a primary housing 114, and a secondary housing 116. These portions may be electrically or optically connected by one or more cables, circuits, or other optical elements capable of transmitting electrical energy or data between portions of the augmented reality display unit 102. Display portion 112 includes one or more optical components and/or light or image sources (e.g., projector 120 illustrated in FIG. 3) capable of generating and transmitting one or more real or virtual images to the user's eyes during operation. In some examples, display portion 112, primary housing 114, and secondary housing 116 are waterproof, or at least water resistant.

Primary housing 114 includes at least one user interface 118, operable from outside of the primary housing 114, that allows the user to interact with the augmented reality display unit 102 and alter or interact with the real or virtual images displayed through the display portion 112. In one example embodiment, user interface 118 is a plurality of buttons that can be depressed by user interaction from the outside of the primary housing 114 to, for example, aid the user in turning on/off the device, navigating between menu options displayed to the user, changing brightness settings, etc. In other examples, interface 118 can be selected from at least one of: a touch capacitive sensor or screen, a sliding switch, or may be provided on a separate device (e.g., peripheral device 150, discussed below). Additionally, or alternatively, display portion 112 and/or secondary housing 116 could include an interface 118 for user input. It should be appreciated that display portion 112 and secondary housing 116 include additional components that facilitate and/or support the functionality of the augmented reality display unit 102 which will be described below with respect to FIG. 3. With continued reference to FIG. 2, in one example embodiment and during operation, the first end E1 is positioned in front of the user/swimmer's eye, e.g., in front of at least one eye covering 110L, 110R (shown in FIG. 1). Additionally, during operation primary housing 114 is positioned to the side of the user's head proximate the user's right temple, and the secondary housing 116 is positioned substantially behind the user's head, e.g., radially 180 degrees about the user's head with respect to the left and right-eye coverings 110L,110R. In other examples, second end E2 wraps around the user's head approximately 270-330 degrees such that the primary housing 114 remains proximate the user's right temple and the second end E2 is proximate the user's left temple, when secured to goggles 104.

Figure 3:
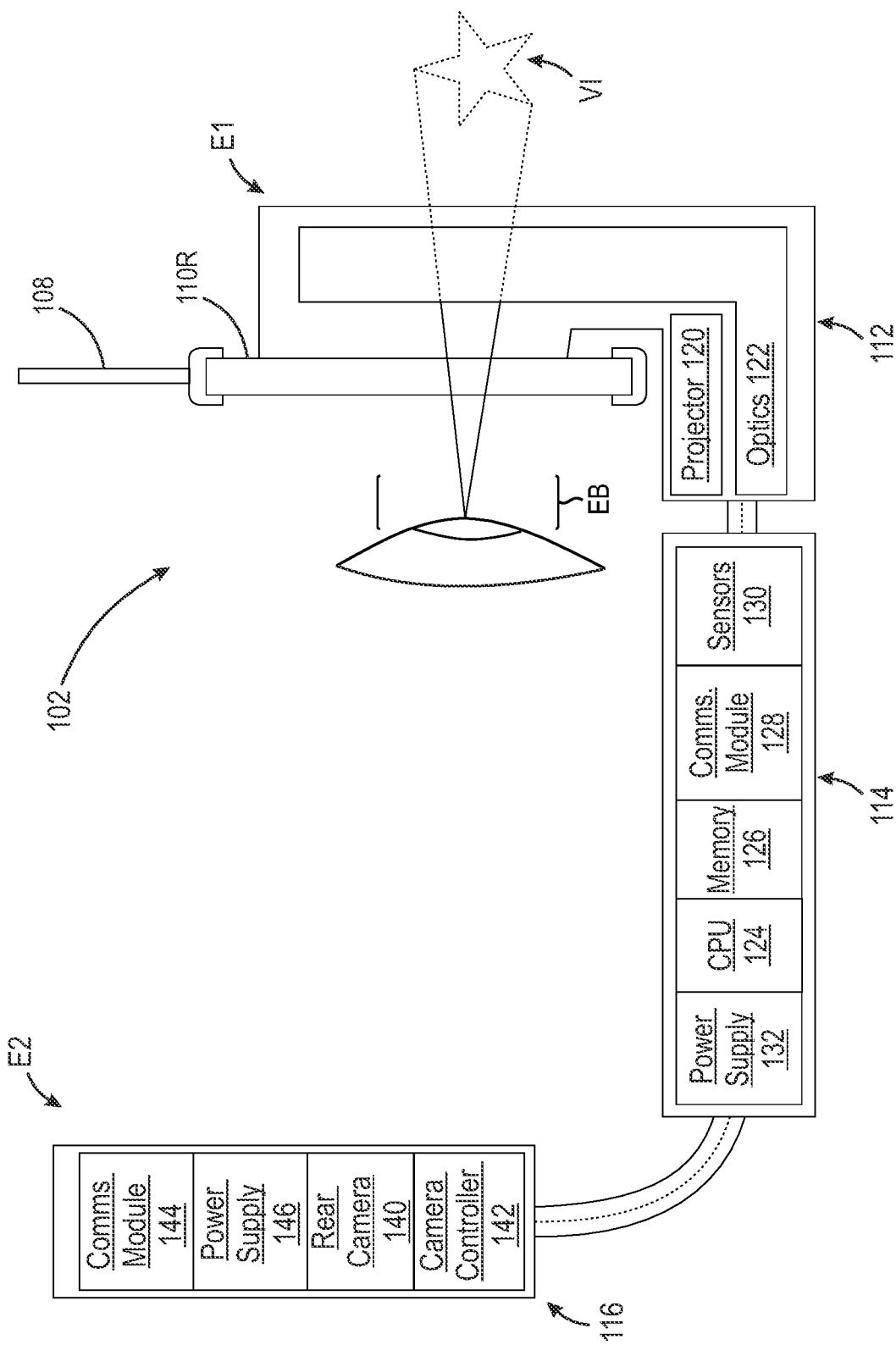
FIG. 3 is a top-schematic view of an augmented reality display unit according to an exemplary embodiment of the presently disclosed subject matter.

FIG. 3 illustrates a top, schematic view of augmented reality display unit 102 including additional internal components. For example, display portion 112 can include one or more projectors 120 or light sources and one or more optical components, i.e., optics 122, configured to generate and transmit, respectively, image-bearing light to the user's eye to form one or more virtual images VI. In some examples, projector or light source 120 can comprise one or more light-emitting diodes (LEDs), organic LEDs (OLEDs), or micro-LEDs (uLEDs). In other examples, projector or light source 120 is a color field sequential projector system operable to pulse image-bearing light of multiple wavebands, for example light from within red, green, and blue wavelength ranges, onto a digital light modulator/micromirror array (a "DLP") or a Liquid Crystal on Silicon ("LCOS") display. In further examples, projector or light source 120 includes one or more pico-projectors, where each pico-projector is configured to produce a single primary color band (e.g., red, green, or blue). In another example, projector or light source 120 includes a single pico-projector arranged to produce all three primary color bands (e.g., red, green, and blue). In one example, the three primary color bands are a green band having a wavelength in the range between 495 nm and 570 nm, a red band having a wavelength in the range between 620 nm and 750 nm, and a blue band having a wavelength in the range between 450 nm and 495 nm. The light generated by the pico-projector, once coupled and transmitted through optics 122, can be used by augmented reality display system 100 to form one or more virtual images VI viewable by a swimmer's eye positioned within the eyebox EB. As used herein, the term "eyebox" is intended to define a two-dimensional area or three-dimensional volume within which an eye, or other optical component, located at any position within the eyebox therein forms one or more focused images. Optics 122 can include one or more of: a LCOS display, a Ferroelectric Liquid Crystal on Silicon (FLCoS) display, a prism, a mirror, or a waveguide. In some examples, the projector or light source 120 and optics 122 include a LCOS display and a prism or prism and mirror combination.

As an alternative to real image projection, augmented reality display unit 102 can produce a virtual image display. In contrast to methods for forming a real image, a virtual image is not formed on a display surface. That is, if a display surface were positioned at the perceived location of a virtual image, no image would be formed on that surface. Virtual image display has inherent advantages for augmented reality presentation. For example, the apparent size of a virtual image is not limited by the size or location of a display surface. Additionally, the source object for a virtual image may be small; a magnifying glass, as a simple example, provides a virtual image of its object. In comparison with systems that project a real image, a more realistic viewing experience can be provided by forming a virtual image that appears to be some distance away from the user. Providing a virtual image also obviates the need to compensate for screen artifacts, as may be necessary when projecting a real image. As shown in FIG. 3, augmented reality display unit 102 provides a virtual image VI (shown as a star made of broken lines), projected into space some distance in front of the surface of the eye covering 110R. In some examples, the virtual image VI is focused at optical infinity. In other examples, the virtual image VI is focused at a finite distance from optics 122.

Figure 4:
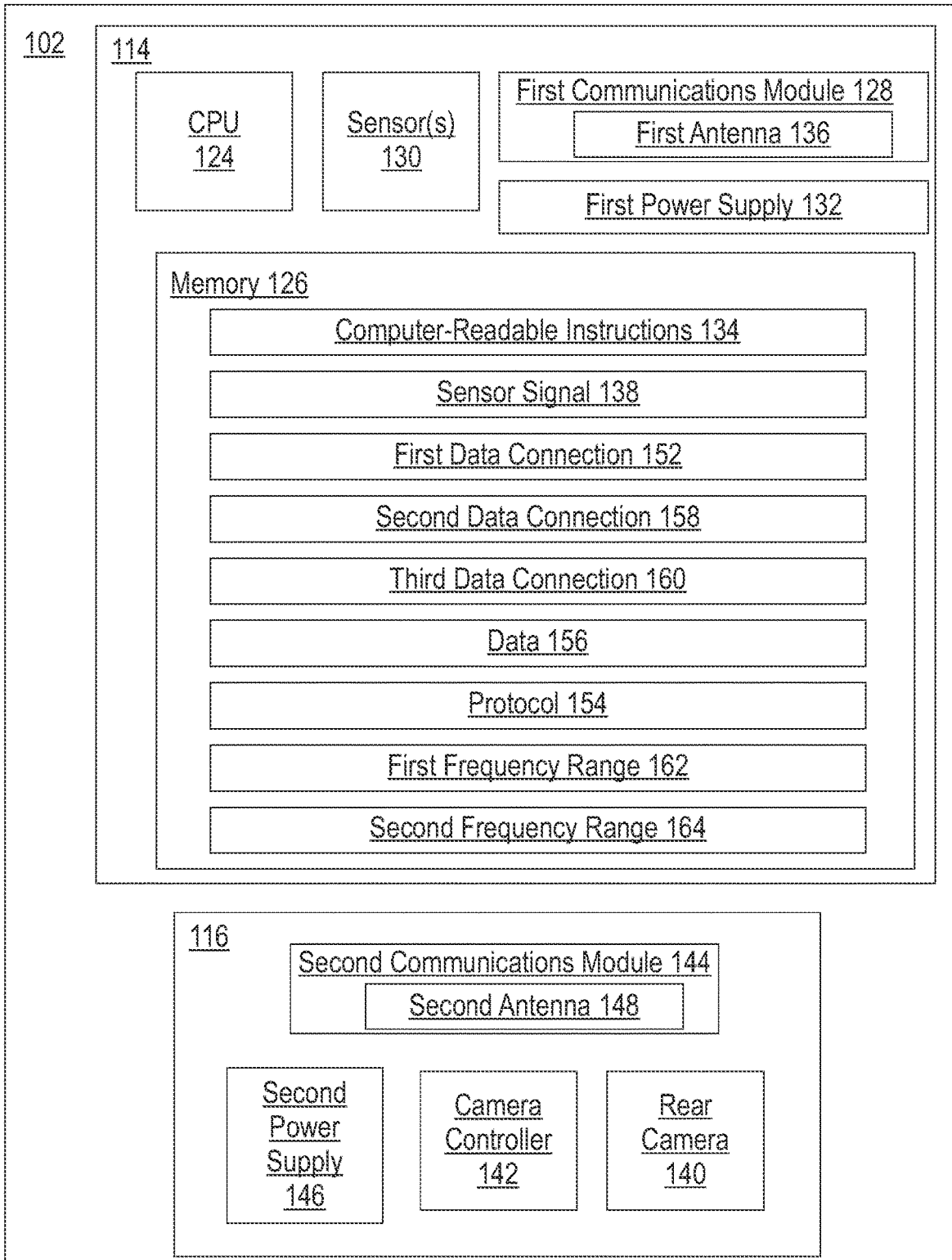
FIG. 4 is a schematic view of an augmented reality display unit according to an exemplary embodiment of the presently disclosed subject matter.

With continued reference to FIG. 3, and additional reference to FIG. 4 (which illustrates another schematic representation of the primary housing 114 and the secondary housing 116 and their respective internal components), primary housing 114 can include a processor or central processing unit (CPU) 124, a non-transitory memory 126, a first communications module 128, one or more sensors 130, and a first power supply 132. As shown in FIG. 4, processor or CPU 124 and non-transitory memory 126 are configured to execute and store, respectively, a set of non-transitory computer-readable instructions 134, that when executed by the CPU 124 are configured to perform the various pieces of functionality attributed to augmented reality display unit 102. First communications module 128 is configured to send and/or receive wired or wireless data communications from one or more communications modules (e.g., second communications module 144 discussed below) or one or more peripheral devices (e.g., peripheral device 150 discussed below). First communications module 128 can include one or more antennas, e.g., first antenna 136, capable of sending and receiving wireless data. In some examples, first communications module 128 can include, in addition to at least one antenna, e.g., first antenna 136, some form of automated gain control (AGC), a modulator and/or demodulator, and potentially a discrete processor for bit-processing that are each electrically connected to CPU 124 and memory 126 to aid in sending and/or receiving wireless data.

Additionally, as shown in FIGS. 3 and 4, primary housing 114 also includes one or more sensors 130 and a first power supply 132. One or more sensors 130 can include at least one of: a gyroscope, an accelerometer, a magnetometer, an inclinometer a global positioning systems (GPS) sensor, a chemical composition sensor, a salinity sensor, a camera, or a microphone. As will be discussed below in detail, one or more sensors 130 are configured to generate at least one sensor signal 138, e.g., an electrical signal, that can be used to indicate a change of orientation or change in environmental conditions used to trigger a switch between antennas, communications modules, or frequencies used for communication. In some examples, sensor 130 is configured to detect the electrical resistance, salinity, or chemical composition of the body of water the augmented reality display unit 102 is placed within. First power supply 132 is positioned within the primary housing 114 and can be selected from at least one of: a battery, capacitor, super-capacitor, or other stand-alone electrical power storage device. In some examples, the first power supply 132 is configured to store electrical power and selectively provide electrical power to at least the components discussed above that are disposed within the primary housing 114. In other examples, first power supply 132 is configured to selectively provide electrical power to the devices disposed within the primary housing 114 as well as the components listed below within the secondary housing 116.

With continued reference to FIGS. 3 and 4, augmented reality display unit 102 also includes a secondary housing 116. Secondary housing 116 includes a rear camera 140, a camera controller 142, a second communications module 144, and a second power supply 146. Rear camera 140 is configured to be located proximate the back of the user's head during operation of augmented reality display unit 102 and is arranged to obtain one or more images or videos depicting a field of view in the direction of the user's legs or feet when laying prostrate or prone in the water, i.e., in a swimming position. United States Patent Application Publication No. 2021-0154558 entitled "Swim AR Goggles," which application is incorporated herein by reference in its entirety, describes methods for utilizing a rearward-facing camera to obtain photographs or video of the horizon or other stationary objects located behind the user/swimmer, while in the swimming position, to act as a reference line to determine the orientation of the user's head while swimming. In other examples, the rear camera 140 can be used to stream live video to the display unit 112 showing the user a view behind the user while they are in a swimming position. In some examples, the rear camera 140 can be a waterproof camera.

The rear camera 140 is electrically connected to camera controller 142, which may include a discrete processor and non-transitory computer-readable memory configured to execute and store, respectively, a set of instructions, that when executed by the discrete processor is configured to perform the functions related to the rear camera 140 as described herein. Additionally, as shown in FIGS. 3 and 4, secondary housing 116 can also include a second communications module 144. Second communications module 144 is configured to send and/or receive wired or wireless data communications from one or more communications modules (e.g., first communications module 128 discussed above) or one or more peripheral devices (e.g., peripheral device 150 discussed below). Second communications module 144 can include one or more antennas, e.g., second antenna 148, capable of sending and receiving wireless data. In some examples, second communications module 144 can include, in addition to at least one antenna, e.g., second antenna 148, some form of automated gain control (AGC), a modulator and/or demodulator, and potentially a discrete processor for bit-processing that are each electrically connected to, e.g., the discrete processor and memory of the camera controller 142 and/or electrically connected (via one or more cables) to the CPU 124 and memory 126 of the primary housing 114, to aid in sending and/or receiving wireless data.

With continued reference to FIGS. 3 and 4, secondary housing 116 can include a second power supply 146. Second power supply 146 is positioned within the second housing 116 and can be selected from at least one of: a battery, capacitor, super-capacitor, or other stand-alone electrical power storage device. In some examples, the second power supply 146 is configured to store electrical power and selectively provide electrical power to at least the components discussed above that are disposed within the secondary housing 116. In other examples, second power supply 146 is configured to selectively provide electrical power to the devices disposed within the secondary housing 116 as well as the components listed above within the primary housing 114.

In some example embodiments, as illustrated in FIG. 5, augmented reality system 100 can also include one or more peripheral devices 150 configured to communicate and exchange data (e.g., data 156 discussed below) with the augmented reality display unit 102. Although shown in FIG. 5 as a smart phone, it should be appreciated that peripheral device 150 can be selected from a smart phone, MP3 player, smart speaker or smart speaker system, a personal computer (PC) or laptop, tablet, a communications hub, a proximity sensor, a heart rate sensor, a wrist/hand motion or location sensor, an ankle/foot motion or location sensor, or any other device capable of sending or receiving wireless data to or from augmented reality display unit 102. As described below, it should be appreciated that these peripheral devices 150 have the capability of communicating with augmented reality display unit 102 in one or more different frequencies ranges. Although not illustrated in FIG. 5, it should be appreciated that peripheral device 150 can include at least one processor and non-transitory computer-readable memory capable of executing and storing, respectively, a set of instructions that when executed by the processor of the peripheral device 150, perform the functions attributed to peripheral device 150 and/or augmented reality system 100 as described herein. Additionally, peripheral device 150 can include a peripheral communications module and a peripheral power supply. The peripheral communications module can be configured to send and/or receive wireless data communications via one or more wireless data connections with one or more communications modules (e.g., first communications module 128 or second communications module 144). As such, the peripheral communications module can include one or more antennas, capable of sending and receiving wireless data. In some examples, the peripheral communications module can include some form of automated gain control (AGC), a modulator and/or demodulator, and potentially a discrete processor for bit-processing that are each electrically connected to, e.g., the peripheral processor and memory of peripheral device 150, to aid in sending and/or receiving wireless data.

In some examples, the peripheral device 150 is capable of establishing or participating in the establishment of one or more wireless data connections by and/or between peripheral device 150 and augmented reality display unit 102. For example, augmented reality display unit 102 can establish a first data connection 152 with peripheral device 150. First data connection 152 is a wireless data connection established between first communications module 128 or first antenna 136 of first communications module 128, and one or more peripheral communication modules of the peripheral device 150. As a wireless data connection, first data connection can utilize one or more wireless protocols 154 to send and/or receive data 156 via the first data connection 152. The protocol 154 can be selected from at least one of: a Bluetooth protocol, a Bluetooth Low-Energy (BLE) protocol, a Zigbee protocol, a Z-Wave protocol, a Thread protocol, 3G, 4G, 5G, or Long Term Evolution (LTE) protocols, a Near Field Communication (NFC) protocol, or a Radio Frequency Identification (RFID) protocol. In some examples, protocol 154 is a digital packet-based protocol. Data 156 can include any form of digital media content, e.g., images, video, and/or audio data, and be converted, divided, combined, and/or rendered using protocol 154. In some examples, data 156 can be a data stream, e.g., including audio and/or visual data, transmitted from peripheral device 150 to augmented reality display unit 102. In other examples, data 156 can be a data stream, e.g., including audio and/or visual data, transmitted from the augmented reality display unit 102 to peripheral device 150, i.e., audio-visual data obtained from one or more cameras located on the augmented reality display unit 102.

In some examples, more than one connection may be established between peripheral device 150 and augmented reality display unit 102. For example, in addition to, or in place of first data connection 152, augmented reality display unit 102 can establish a second data connection 158 with peripheral device 150. Second data connection 158 may also be a wireless data connection and may be established between second communications module 144 or second antenna 148 of second communications module 144, and one or more peripheral communication modules of the peripheral device 150. As described above, second data connection 158 can utilize one or more wireless protocols 154 to send and/or receive data 156 via the second data connection 158. It should be appreciated that the second data connection 158 can utilize the same protocol 154 as first data connection 152 or a different protocol 154 than first data connection 152. Additionally, it should be appreciated that second data connection 158 can utilize the same protocol 154 as the first data connection 152 but may utilize a different frequency or different channel than first data connection 152.

Additionally, a third data connection 160 (illustrated in FIG. 4) may be established between the first communications module 128 or first antenna 136 and the second communications module 144 or second antenna 148. The third data connection 160 may be a wired (via one or more physical cables) or wireless data connection and may utilize one or more protocols 154 to transfer data 156 between the first communications module 128 and second communications module 144. In some examples, where augmented reality display unit 102 is configured to establish one or more data connections, e.g., first data connection 152 and/or second data connection 158, augmented reality display unit 102 can be configured to establish one or more additional data connections with one or more additional peripheral devise 150, e.g., one or more heart rate sensors, one or more wrist/hand sensors, and/or one or more ankle/foot sensors.

In some examples, augmented reality display system 100 can also include two or more peripheral devices 150 where one of the peripheral devices 150 may act as in intermediary device for wired or wireless communications within the system. For example, augmented reality display system can, in some embodiments, include both a smart phone and a communications hub where the smart phone is configured to establish or participate in establishing one or more wired or wireless connections with the communications hub, and the communications hub is configured to establish or participate in establishing one or more wireless connections with augmented reality display unit 102 as described herein. In these examples, it should be appreciated that communications between the communications hub and the augmented reality display unit 102 may utilize a different protocol 154 than the communications between the communications hub and the smart phone or other peripheral device. In some examples the protocol 154 used in the wired or wireless connection between the communications hub and the smart phone is a proprietary protocol. In some examples, the communications hub acts as an intermediary that can translate the communications protocol 154 or frequency of communications used between the communications hub and the augmented reality display unit 102 to a different communications protocol 154 or frequency used between the communications hub and the smart phone. In some examples, the wireless connection between the augmented reality display unit 102 and the communications hub utilizes an underwater frequency, e.g., a frequency band selected from within the range of 10 Hz to 1 MHz, and the communications hub is configured to translate data 156 transmitted to the communication hub using that underwater frequency to a different frequency usable with respect to the smart phone, e.g., to a 2.4 GHz frequency Wi-Fi protocol.

As shown in FIG. 5, when performing certain swimming strokes, e.g., freestyle, the swimmer is typically traversing the length of a swimming pool or traversing some distance in open water with their head facing downward toward the bottom of the pool or the ground beneath the surface of the water. For example, as shown in FIG. 5, the swimmer is laying or floating in a prone position with the swimmer's arms, torso, and legs substantially forming a horizontal line, i.e., a line substantially parallel with the horizon or surface of the water. While in this position, it becomes necessary to rotate the swimmer's head to breathe at regular intervals. Typically, a swimmer aspires to maintain breath control that is relative to the cadence of their swim strokes. For example, a swimmer may train to breathe every other, every third, or every fifth stroke. When breathing, the swimmer maintains their prone position and rotates their head, e.g., 30-90 degrees clockwise or counter-clockwise with respect to an axis passing through the swimmer's body from head to foot. When swimming freestyle, the direction of head rotation is to the same side of the swimmer's body as the arm that is out of the water in the recovery portion of the stroke. For example, the swimmer will breathe to their left side (clockwise) when their left arm is out of the water and the swimmer will breathe to their right side (counter-clockwise) when their right arm is out of the water. Some swimmers, in order to maintain balanced power, muscle growth, and prevent strain, aspire to breathe in odd breath control patterns, e.g., every third or fifth breath, and therefore, will alternate the rotational direction of their breaths to opposing sides. For example, a swimmer with a breath control pattern of every third stroke will breathe to their right side when their right arm is out of the water, take three strokes, and then breathe to their left side as the left arm is now out of the water.

Figure 6A:
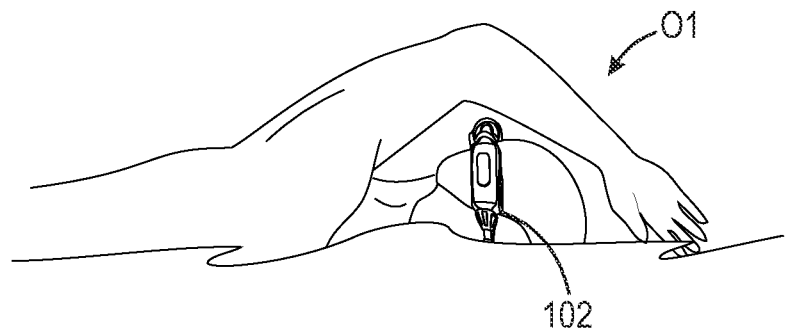
FIG. 6A is a contextual side-view of a user/swimmer in one possible orientation according to an exemplary embodiment of the presently disclosed subject matter.
Figure 6B:
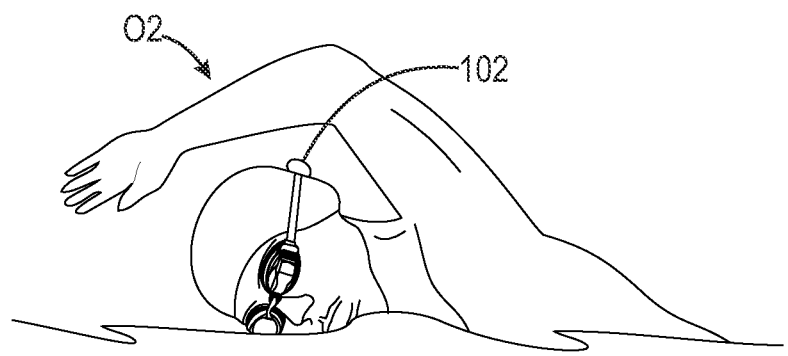
FIG. 6B is a contextual side-view of a user/swimmer in one possible orientation according to an exemplary embodiment of the presently disclosed subject matter.
Figure 6C:
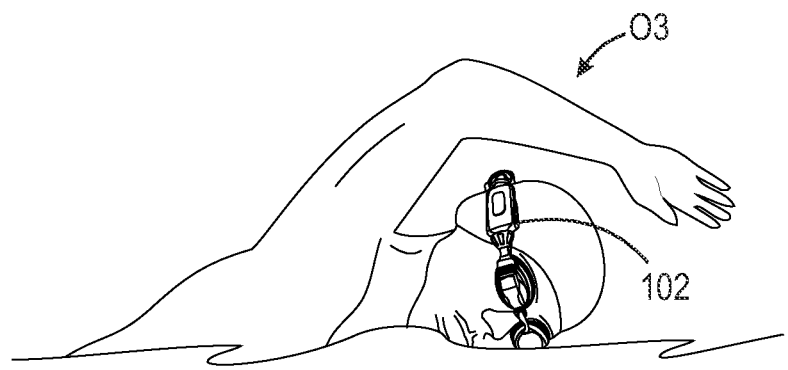
FIG. 6C is a contextual side-view of a user/swimmer in one possible orientation according to an exemplary embodiment of the presently disclosed subject matter.

FIGS. 6A-6C show three possible orientations of the swimmer's body and/or the swimmer's head when performing the freestyle swimming stroke. FIG. 6A illustrates a swimmer/user in a first orientation O1 where the swimmer is laying prone parallel with the surface of the water and their head and face directed downward. FIG. 6B illustrates the swimmer/user in a second orientation O2, breathing to their left side (clockwise) with their left arm in the recovery portion of the stroke. FIG. 6C illustrates the swimmer/user in a third orientation O3, breathing to their right side (counter-clockwise) with their right arm in the recovery portion of the stroke.

Referring generally to FIGS. 5-6C, when attempting to establish and maintain a wireless data connection, e.g., first wireless data connection 152, the orientation of the user's head and/or the presence of water surrounding the first communications module 128 or first antenna 136, may cause undesirable levels of interference or attenuation, leading to packet loss and/or a complete disconnection between augmented reality display unit 102 and a peripheral device, e.g., peripheral device 150. For example, in one possible configuration of augmented reality system 100, augmented reality display unit 102 is secured to goggle strap 106 and right-eye covering 110R (as shown in FIG. 1) such that the primary housing 114, including the first communications module 128 and first antenna 136, is positioned substantially along the right side of the user's head. In an exemplary embodiment, the first antenna 136 is arranged at the first end E1 of the augmented reality display unit 102, and the second antenna 148 is arranged at the second end E2 of the augmented reality display unit 102 (e.g., the first and second antennae 136, 148 are located at opposing distal ends of the augmented reality display unit 102). Should the user breathe to their left side (clockwise rotation), i.e., transition to orientation O2 (shown in FIG. 6B), the right side of the user's head, and therefore the primary housing 114 and first communications module 128, will be submerged under the surface of the water. Submersion in water, may attenuate or otherwise negatively affect the signal quality of the established first wireless data connection 152, which may lead to temporary or periodic signal/packet loss while the user remains in this orientation. Likewise, in configurations where the user has secured augmented reality display unit 102 to goggle strap 106 and left-eye covering 110L, when the user breathes to their right side (counter-clockwise rotation), i.e., transitions to third orientation O3 (shown in FIG. 6C), primary housing 114 and first communications module 128 will be submerged under the surface of the water and may lead to undesirable packet loss or complete disconnection of an established data connection. Thus, the present application provides systems and methods for automatically switching between communications modules or switching between specific antennas to maintain a stable data connection during the periodic transitions between the first orientation O1, second orientation O2, and/or third orientation O3, without packet loss or without significant packet loss.

With reference to FIGS. 1-6C, in one operational example, augmented reality system 100 can automatically switch communications modules and/or switch antennas, based on sensor data, to utilize a different data connection with less attenuation or interference caused by partial or complete submersion of at least a portion of the augmented reality display unit 102. For example, the user/swimmer may secure augmented reality display unit 102 to the goggle strap 106 and right-eye covering 110R via one or more elastic securing members ESM (shown in FIG. 1). In this configuration, the first communications module 128 is located proximate the user's right temple and the second communications module 144 is substantially located at the back of the user's head. Augmented reality display unit 102 can establish or participate in establishing one or more data connections, e.g., first data connection 152 between first communications module 128 and peripheral device 150, and/or a second data connection 158 established between second communications module 144 and peripheral device 150. In this example, the peripheral device 150 is a smart phone and the first data connection 152 and/or the second data connection 158 utilize wireless data protocols 154, e.g., Wi-Fi data protocols. Initially, augmented reality display system 100 can utilize first data connection 152 to send and/or receive data 156 between the peripheral device 150 and augmented reality display unit 102. This data may be utilized to display one or more pieces of data 156 to the user via the projector 120 and/or VR optics 122 as one or more virtual images VI (as shown in FIG. 3).

In this example, augmented reality display unit 102 can include one or more sensors 130, e.g., a gyroscope, accelerometer, and/or magnetometer, to determine the orientation of the user's head with respect to the bottom of the pool or the ground beneath the user/swimmer. Since sensor(s) 130 are located within the primary housing 114 (proximate the user's right temple), when the user/swimmer is in the first orientation O1 (shown in FIG. 6A) or the third orientation O3 (shown in FIG. 6C), i.e., where the right side of the user's head is out of the water, augmented reality display system 100 can maintain the first data connection 152 with little to no interference or attenuation caused by proximity to or submersion beneath the waterline. However, should the sensor(s) 130 determine that the user's head is in the second orientation O2 (shown in FIG. 6B), i.e., where the right side of the user's head is submerged beneath the waterline so the user can breathe to the left side, a sensor signal 138 to processor 124 of augmented reality display system 100 can operate to automatically switch to utilizing the second data connection 158 to send and/or receive data 156. As the second communications module 144 is located at the back of the user's head, when the user is in the second orientation O2 the secondary housing 116 and the second communications module 144 will still be above the waterline, allowing a seamless transition in the wireless transmission of data 156 to and/or from the augmented reality display unit 102 with little to no attenuation caused by submersion under the waterline. Although described above as two simultaneous, or preestablished data connections, i.e., where first data connection 152 and second data connection 158 are established simultaneously before any rotation of the user's head to different orientations, it should be appreciated that augmented reality display system 100 may initially establish only a single data connection, e.g., first data connection 152, and upon receiving sensor signal 138 informing the system that the orientation has changed to second orientation O2, the system can establish the second data connection, e.g., second data connection 158, and automatically begin sending and/or receiving data 156 via the second data connection 158 once established.

In the above example, it should be appreciated that data 156 sent and/or received via the second data connection 158, can be transmitted between the first communications module 128 and second communications module 144, and vice versa, via an additional or third data connection 160 such that data 156 received by second communications module 144 can be utilized by processor 124 to generate one or more virtual images VI to the user via the projector 120 and optics 122. It should be appreciated that the third data connection 160 can be a wireless data connection, e.g., between first antenna 136 and second antenna 148, or third data connection 160 can be a wired data connection utilizing one or more wires or cables disposed within the augmented reality display unit 102 between the primary housing 114 and the secondary housing 116.

In another operational example, augmented reality display system 100 can include one or more environment-specific antenna configurations, where augmented reality display system 100 can automatically switch between communications modules and/or antennas based on the electrical resistance, salinity, or chemical composition of the body of water the augmented reality display unit 102 is placed within. For example, primary housing 114, secondary housing 116, first communications module 128, and/or second communications module 144 can include one or more environment-specific antennas. These environment-specific antennas can utilize certain frequencies or frequency ranges, operational band-widths, protocols, and/or power usage requirements, such that they are tuned for efficient operation and/or data transfer within a specific environment. For example, a first environment-specific antenna can be tuned for efficient operation when surrounded by, exposed to, or submerged in pool water; a second environmental-specific antenna can be tuned for efficient operation when surrounded by, exposed to, or submerged in fresh water, e.g., a fresh water lake or pond; and, a third environment-specific antenna can be tuned for efficient operation when surrounded by, exposed to, or submerged in salt water, e.g., an ocean. In operation, when augmented reality display unit 102 is placed in contact with or submerged beneath the waterline of a particular body of water, sensor 130 can detect the particular electrical resistance, salinity, or chemical composition of the water and produce a sensor signal 138 that, when received by the processor 124 operates to automatically utilize one or more environment-specific antennas for data transmission of data 156. It should be appreciated that the one or more environment-specific antennas can be positioned within the same housing (e.g., within primary housing 114 or secondary housing 116) or within or electrically connected to the same communications module (e.g., within or connected to first communications module 128 or second communications module 144). It should also be appreciated that the one or more environment-specific antennas can be located within different housings, e.g., primary housing 114 and secondary housing 116, or can be located within peripheral device 150.

In another operational example, augmented reality display system 100 can, in response to sensor data (or sensor signal 138), automatically switch frequency ranges using a single communications module or antenna. For example, the user/swimmer may secure augmented reality display unit 102 to the goggle strap 106 and right-eye covering 110R via one or more elastic securing members ESM. In this configuration, the first communications module 128 is located proximate the user's right temple. Augmented reality display unit 102 can establish or participate in establishing first data connection 152 between first communications module 128 and peripheral device 150, using a first frequency range 162. In one example, first data connection 152 is a wireless data connection utilizing a Wi-Fi protocol 154. In this example, the first frequency range 162 of first data connection 152 is between 4.5 and 5.5 GHz, e.g., around 5 GHz. Should the user/swimmer alter their head orientation, e.g., transition from first orientation O1 to second orientation O2 (where the primary housing 114 and first communications module 128 is submerged beneath the waterline), one or more sensors 130 can send a sensor signal 138 to processor 124 which operates to automatically switch first data connection 152 from using a first frequency range 162 to a second frequency range 164 different than the first. In some examples, the second frequency range 164 is a lower frequency than the first, as higher frequency transmissions are attenuated more than low frequencies. For example, second frequency range is between 2.0 and 2.8 GHz, e.g., 2.4 GHz. Additionally, or alternatively, the frequency range used could automatically switch based on one or more sensors 130 determining that the electrical resistance, salinity, or chemical composition of the body of water the augmented reality display unit 102 is placed within is a pool, fresh water, or salt water. For example, Radio Frequency signals meet more resistance and attenuation when travelling through salt water than fresh water. Therefore, should sensor 130 determine the augmented reality display unit 102 is in contact with salt water, augmented reality display unit 102 can switch to using a lower frequency range, e.g., second frequency range 164, to decrease the effects of attenuation caused by the presence of salt water.

In any of the foregoing operational examples set forth above, it should be appreciated that one or more additional data connections can be established between augmented reality display unit 102 and one or more additional peripheral devices 150. For example, the user/swimmer may secure a wireless heart rate monitor/sensor device to their body, e.g., to their chest or arm, and augmented reality display unit 102 can establish or participate in establishing an additional data connection with that heart rate sensor, such that data 156 sent between the heart rate sensor and the augmented reality display unit 102 can be processed and rendered into a real-time display of the user's heart rate as at least a portion of a virtual image VI using projector 120 and optics 122. Alternatively, or additionally, the user/swimmer may secure a motion or location sensor to one or more of their wrists or hands and/or may secure a motion or location sensor to one or more of their ankles or feet. In this example, augmented reality display unit 102 may establish or participate in establishing one or more additional data connections with each of these sensors such that data 156 sent between the sensors and augmented reality display unit 102 can be processed by the CPU 124 and may be rendered as a part of the virtual image VI displayed to the user in the form of a visualization of the user's hand or foot position, a visualization of the user's stroke rate or stroke speed, and/or a visualization of the user's kick rate or kick speed. In each of these examples, should sensor 130 determine that augmented reality display unit 102 has changed orientation, e.g., from first orientation O1 to second orientation O2, or determine that augmented reality display unit 102 is located in a body of water with the ability to severely attenuate wireless signals, e.g., salt water, augmented reality display unit 102 can operate to switch between communication modules, antennas, or operational frequencies as described above to lessen any such attenuation between the augmented reality display unit 102 and any of these additional peripheral devices. It should also be appreciated that, should the additional data connections utilize a Bluetooth protocol 154, any additional peripheral devices 150 placed within 0-6 inches of the augmented reality display unit 102 should be fully operational without any significant attenuation and the foregoing switching methods may not be necessary.

Figure 7:
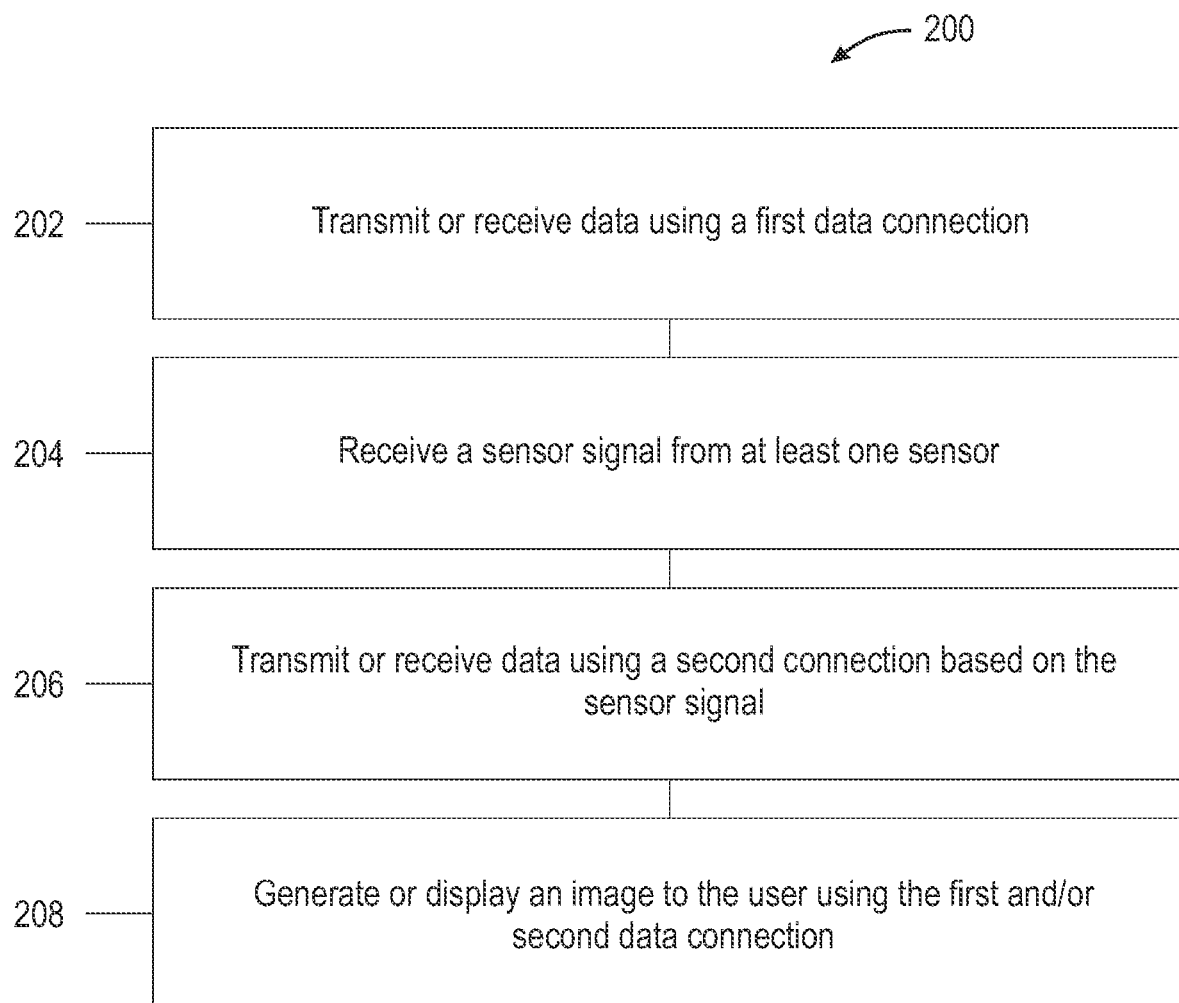
FIG. 7 is a flow-chart illustrating steps of a method according to an exemplary embodiment of the presently disclosed subject matter.

FIG. 7 illustrates one example of a method 200 of transmitting or receiving data 156 from an augmented reality display unit 102 according to the present disclosure. Method 200 includes, for example: transmitting or receiving data 156 using a first data connection 152 established between a first communications module 128 or a first antenna 136 of the augmented reality display unit 102 and a peripheral device 150 (step 202); receiving by at least one processor 124 of the augmented reality display unit 102, a sensor signal 138 obtained by at least one sensor 130 of the augmented reality display unit 102 (step 204); transmitting or receiving the data 156 using a second data connection 158 established between a second communications module 144 or second antenna 148 of the augmented reality display unit 102, based on the sensor signal 138 (step 206); and generating and displaying an image (VI) to a viewer using the data 156 received via the first and/or second wireless data connection (152, 158) (step 208).

Figure 8:
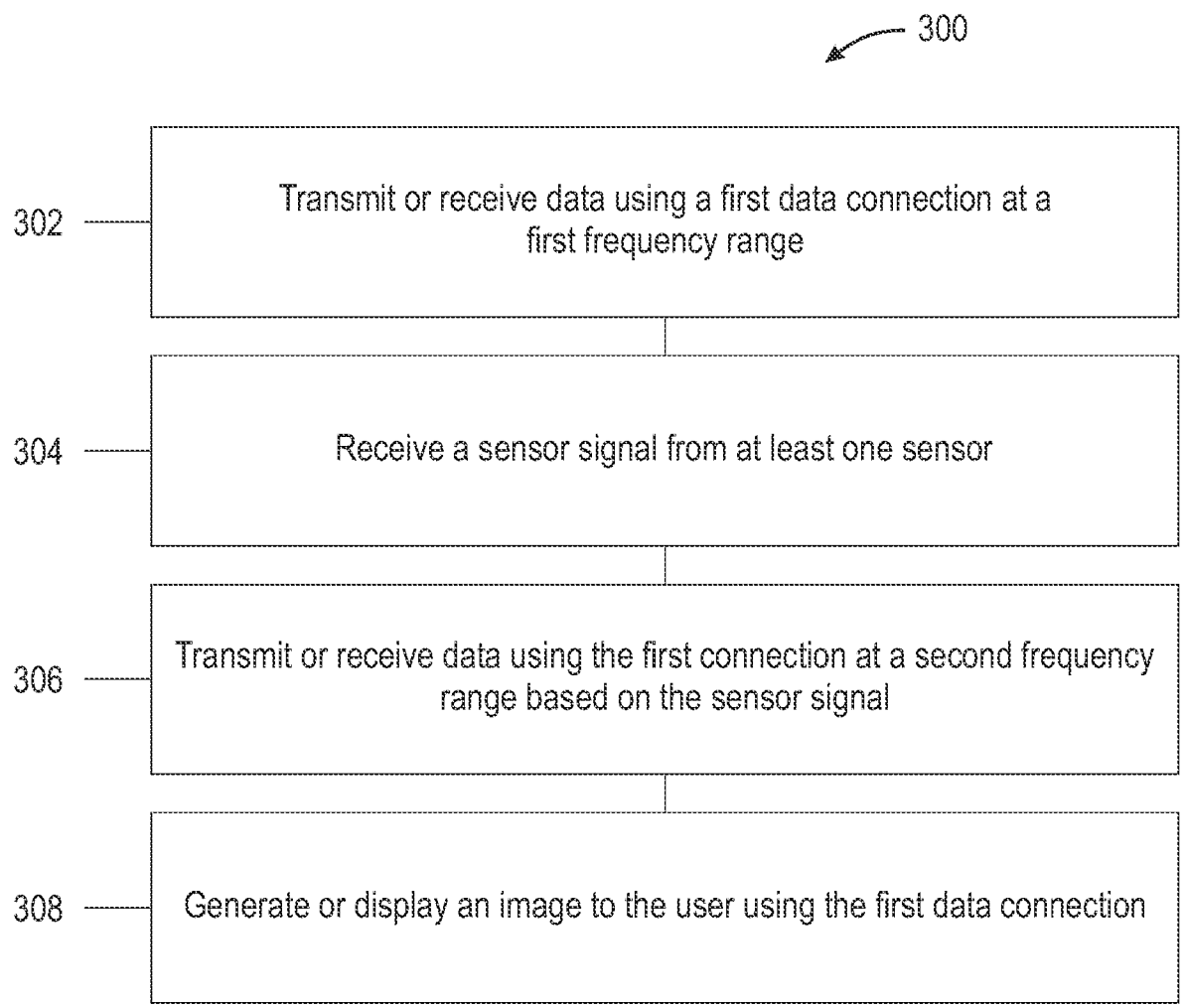
FIG. 8 is a flow-chart illustrating steps of a method according to an exemplary embodiment of the presently disclosed subject matter.

FIG. 8 illustrates one example of a method 300 of transmitting or receiving data 156 from an augmented reality display unit 102 according to the present disclosure. Method 300 includes, for example: transmitting or receiving data using a first data connection 152 established between a communications module (128,144) or an antenna (136,148) of the augmented reality display unit 102 and a peripheral device 150, wherein the first data connection utilizes a first frequency range 162 (step 302); receiving by at least one processor 124 of the augmented reality display unit 102, a sensor signal 138 obtained by at least one sensor 130 of the augmented reality display unit 102 (step 304); transmitting or receiving the data 156 using the first data connection 152 at a second frequency range 164 different from the first frequency range based on the sensor signal 138 (step 306); and generating or displaying an augmented reality image VI to a viewer using the data 156 received via the first data connection 152 (step 308).

One or more features of the embodiments described herein may be combined to create additional embodiments which are not depicted. While various embodiments have been described in detail above, it should be understood that they have been presented by way of example, and not limitation. It will be apparent to persons skilled in the relevant arts that the disclosed subject matter may be embodied in other specific forms, variations, and modifications without departing from the scope, spirit, or essential characteristics thereof. The embodiments described above are therefore to be considered in all respects as illustrative, and not restrictive. The scope of the invention is indicated by the appended claims, and all changes that come within the meaning and range of equivalents thereof are intended to be embraced therein.

What is claimed is:

1. A method of transmitting or receiving data from an augmented reality display unit, the method comprising:
   transmitting or receiving data using a first data connection established between a first communications module comprising a first antenna of the augmented reality display unit, and a peripheral device;
   receiving by at least one processor of the augmented reality display unit, a sensor signal obtained by at least one sensor of the augmented reality display unit;
   transmitting or receiving the data using a second data connection established between a second communications module comprising a second antenna of the augmented reality display unit, based on the sensor signal, wherein the at least one processor is configured to change which of the first and/or second communications modules is utilized to transmit and/or receive the data as a result of at least one of a change of orientation of the augmented reality display unit or a change in environmental condition of the augmented reality display unit; and
   generating an image via an image source using the data received via the first and/or second data connection, and transmitting the image to an eyebox via one or more optics.

2. The method of claim 1, wherein the first and second communications modules are located at opposing, distal ends of the augmented reality display unit.

3. The method of claim 1, wherein the augmented reality display unit is waterproof or water resistant.

4. The method of claim 1, wherein a sensor of the augmented reality display unit is configured to generate the sensor signal, the sensor being configured to measure at least one of:
   (i) a salinity level of water; (ii) a chemical composition of water; (iii) electrical resistivity or conductivity; or (iii) an orientation of the augmented reality display unit.

5. The method of claim 4, wherein the orientation is determined by the sensor, and wherein the sensor is selected from at least one of: a gyroscope, an accelerometer, a magnetometer, or a camera.

6. The method of claim 1, wherein the data is transmitted or received using a third data connection established between the first communications module and the second communications module.

7. The method of claim 1, wherein the third data connection is a wired data connection.

8. The method of claim 1, further comprising securing at least a portion of the augmented reality display unit to a pair of goggles.

9. The method of claim 8, wherein the augmented reality display unit is secured to a portion of left or right-eye covering of the pair of goggles.

10. The method of claim 8, wherein the pair of goggles are swimming goggles.

11. The method of claim 1, wherein the first data connection and the second data connection are configured to utilize at least one of: a Bluetooth Classic protocol; a Bluetooth Low-Energy (BLE) protocol; a Wi-Fi protocol; a Zigbee protocol; or a Global Positioning Systems (GPS) protocol.

12. A method of transmitting or receiving data from an augmented reality display unit, the method comprising:
   transmitting or receiving data using a first data connection established between a communications module comprising an antenna of the augmented reality display unit and a peripheral device, wherein the first data connection utilizes a first frequency range;
   receiving by at least one processor of the augmented reality display unit, a sensor signal obtained by at least one sensor of the augmented reality display unit;
   transmitting or receiving the data using the first data connection at a second frequency range different from the first frequency range based on the sensor signal, wherein the at least one processor is configured to change the frequency range utilized to transmit and/or receive the data as a result of at least one of a change of orientation of the augmented reality display unit or a change in environmental condition of the augmented reality display unit; and
   generating an image via an image source using the data received via the first data connection, and transmitting the image to an eyebox via one or more optics.

13. The method of claim 12, wherein the augmented reality display unit is waterproof or water resistant.

14. The method of claim 12, wherein a sensor of the augmented reality display unit is configured to generate the sensor signal, the sensor being configured to measure at least one of:
   (i) a salinity level of water; (ii) a chemical composition of water; (iii) electrical resistivity or conductivity; or (iii) an orientation of the augmented reality display unit.

15. The method of claim 14, wherein the orientation is determined by the sensor, and wherein the sensor is selected from at least one of: a gyroscope, an accelerometer, a magnetometer, or a camera.

16. The method of claim 12, further comprising securing at least a portion of the augmented reality display unit to a pair of goggles.

17. The method of claim 16, wherein the augmented reality display is secured to a portion of a left or right-eye covering of the pair of goggles.

18. The method of claim 16, wherein the pair of goggles are swimming goggles.

19. The method of claim 12, wherein the first data connection is configured to utilize at least one of: a Bluetooth Classic protocol; a Bluetooth Low-Energy (BLE) protocol; a Wi-Fi protocol; a Zigbee protocol; or a Global Positioning Systems (GPS) protocol.

20. An augmented reality display unit, comprising:
- a first communications module comprising a first antenna operable to transmit and/or receive data using a first data connection with a peripheral device;
- a second communications module comprising a second antenna operable to transmit and/or receive the data using a second data connection;
- at least one sensor configured to detect a change of orientation of the augmented reality display unit or a change in environmental condition surrounding the augmented reality display unit;
- at least one processor operable to receive a signal from the at least one sensor, wherein the at least one processor is configured to change which of the first and/or second communications modules is utilized to transmit and/or receive the data as a result of the signal from the at least one sensor;
- an image source configured to generate an image using the data received via the first and/or second data connection; and
- one or more optical components configured to transmit the image to an eyebox.

* * * * *